United States Patent
Chiu

(10) Patent No.: US 8,036,518 B2
(45) Date of Patent: Oct. 11, 2011

(54) MOTOR AND MOTOR SPEED CONTROLLING SYSTEM

(75) Inventor: Chin-Fa Chiu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 512 days.

(21) Appl. No.: 12/210,121

(22) Filed: Sep. 12, 2008

(65) Prior Publication Data

US 2009/0128078 A1  May 21, 2009

(30) Foreign Application Priority Data

Nov. 16, 2007  (TW) .............................. 96143391 A

(51) Int. Cl.
*G05B 11/28* (2006.01)
(52) U.S. Cl. .................. 388/811; 318/599; 318/400.13; 318/400.17; 318/400.23
(58) Field of Classification Search .................. 318/254, 318/268, 632, 599, 432, 439, 400.12, 400.22, 318/400.1, 400.13, 400.17, 400.29, 400.32; 388/811
See application file for complete search history.

(56) References Cited

U.S. PATENT DOCUMENTS

| | | | | |
|---|---|---|---|---|
| 5,789,723 A * | 8/1998 | Hirst | ............................. | 219/501 |
| 6,008,603 A * | 12/1999 | Jones et al. | ............. | 318/400.32 |
| 6,054,823 A * | 4/2000 | Collings et al. | .......... | 318/400.04 |
| 6,236,175 B1 * | 5/2001 | Mourad et al. | ................ | 318/268 |
| 6,274,991 B1 * | 8/2001 | Busch | ....................... | 318/400.32 |
| 6,650,074 B1 * | 11/2003 | Vyssotski et al. | ........ | 318/400.12 |
| 7,053,582 B2 * | 5/2006 | Ueyama et al. | ............... | 318/632 |
| 7,138,781 B2 * | 11/2006 | Murray et al. | .......... | 318/400.04 |
| 7,141,950 B1 * | 11/2006 | Verge | ........................ | 318/400.29 |
| 7,173,395 B2 * | 2/2007 | Matsubara et al. | ............ | 318/803 |
| 7,327,114 B2 * | 2/2008 | Verge | ............................. | 318/599 |
| 7,336,046 B2 * | 2/2008 | Yasue | ...................... | 318/400.21 |
| 7,425,809 B2 * | 9/2008 | Shen et al. | ...................... | 318/471 |
| 7,659,678 B2 * | 2/2010 | Maiocchi | ................. | 318/400.22 |
| 7,733,047 B2 * | 6/2010 | Ikeda et al. | .................... | 318/432 |
| 7,778,185 B2 * | 8/2010 | Kollner et al. | ................. | 370/241 |
| 2006/0214616 A1 * | 9/2006 | Shen et al. | ...................... | 318/439 |
| 2007/0200518 A1 * | 8/2007 | Verge | .......................... | 318/268 |
| 2007/0247091 A1 * | 10/2007 | Maiocchi | ........................ | 318/254 |
| 2009/0052315 A1 * | 2/2009 | Kollner et al. | ................ | 370/212 |

* cited by examiner

*Primary Examiner* — Paul Ip
(74) *Attorney, Agent, or Firm* — Muncy, Geissler, Olds & Lowe, PLLC

(57) ABSTRACT

A motor and a motor speed control system are disclosed. Two power signal lines and one feedback/speed-control signal line are coupled between a control device and the motor. The two power signal lines electrically connect the control device to the motor. The feedback/speed-control signal line bi-directionally transmits signals coming from the control device to the motor and from the motor to the control device.

20 Claims, 2 Drawing Sheets

MOTOR AND MOTOR SPEED CONTROLLING SYSTEM

CROSS REFERENCE TO RELATED APPLICATIONS

This Non-provisional application claims priority under 35 U.S.C. §119(a) on Patent Application No(s). 096143391, filed in Taiwan, Republic of China on Nov. 16, 2007, the entire contents of which are hereby incorporated by reference.

BACKGROUND OF THE INVENTION

1. Field of Invention

The present invention relates to a motor and a motor speed control system.

2. Related Art

In the prior art, many signal lines are coupled between a motor and a control device for controlling the motor to rotate, and the connections therebetween are very complicated. For example, a controller for controlling a brushless motor for driving a fan, is shown in FIG. 1. Herein, a positive power signal line 161 and a negative power signal line 162 are coupled between a controller 12 and a brushless motor 14, so that the controller 12 and the brushless motor 14 are electrically connected to each other. In addition, a speed-control signal line 163 is for transmitting a speed-control signal generated by the controller 12 to the brushless motor 14 so that a processor (not shown) inside the brushless motor 14 can drive the brushless motor 14 to rotate at a specific speed according to the speed-control signal of the controller 12. A rotating speed feedback signal line 164 coupled between the controller 12 and the brushless motor 14 is for transmitting a feedback signal generated by the processor inside the brushless motor 14 to the controller 12. Thus, the controller 12 can identify whether the rotating speed of the brushless motor 14 at each timing can satisfy the setting of the rotating speed corresponding to the speed-control signal at the timing or not according to the received feedback signal.

Consequently, in order to precisely monitor the rotation of the brushless motor 14, at least four signal lines, such as the positive power signal line 161, the negative power signal line 162, the speed-control signal line 163 and the speed feedback signal line 164, have to be coupled between the brushless motor 14 and the controller 12 for controlling the motor. The speed-control signal line 163 and the speed feedback signal line 164 are respectively for transmitting the signal from the controller 12 to the brushless motor 14 and the signal from the brushless motor 14 to the controller 12. That is, the speed-control signal line 163 and the speed feedback signal line 164 are signal lines for one-way transmission. However, the control signals between the controller 12 and the brushless motor 14 include not only the speed-control signal and the feedback signal, but also a driving signal, a timing signal and other signals. In order to transmit these signals, more than four signal lines are coupled between the controller 12 and the brushless motor 14 in the practical application. Therefore, the overall circuit architecture is very complicated, and the element cost, assembling time and device error rate are inversely influenced.

SUMMARY OF THE INVENTION

In view of the foregoing, the present invention is to provide a motor and a motor speed control system capable of simplifying the circuit design between a control device and the motor using a feedback/speed-control signal line, which can transmit signals bi-directionally. Therefore, a speed-control signal coming from the control device and a feedback signal coming from the motor are transmitted via the same signal line so as to achieve the purposes of simplifying the circuit, decreasing the cost and decreasing the device error rate.

To achieve the above, the present invention discloses a motor speed control system includes a control device, a motor and a plurality of signal lines coupled between the control device and the motor. The signal lines include two power signal lines and one feedback/speed-control signal line. Therefore, after the control device generates a speed-control signal, the speed-control signal is transmitted to the motor via the feedback/speed-control signal line coupled between the control device and the motor. The control circuit in the motor receives the speed-control signal and then drives the motor to correspondingly rotate and generate a feedback signal simultaneously according to the speed-control signal. Then, the feedback signal is fed back to the control device via the feedback/speed-control signal line so that the control device judges whether the motor can operate normally according to the feedback signal.

In addition, the present invention also discloses a motor, which is electrically connected to a control device. The motor includes a control circuit and a plurality of signal lines, which are coupled between the control circuit and the control device. The signal lines include two power signal lines and a feedback/speed-control signal line. The control device generates a speed-control signal to control the motor to rotate, and the rotating motor generates a feedback signal to the control device. The speed-control signal and the feedback signal are transmitted via the feedback/speed-control signal line with the bi-directional transmission ability.

As mentioned above, the signals from the control device and the motor are transmitted via the signal line with the bi-directional transmission ability in the motor and the motor speed control system of the present invention. Compared with the prior art, each of the motor and the motor speed control system of the present invention has been simplified their circuit designs, and the control device still can precisely control the rotating speed of the motor. Meanwhile, the motor can also feed back the rotating speed signal to the control device to ensure that the motor operate normally.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
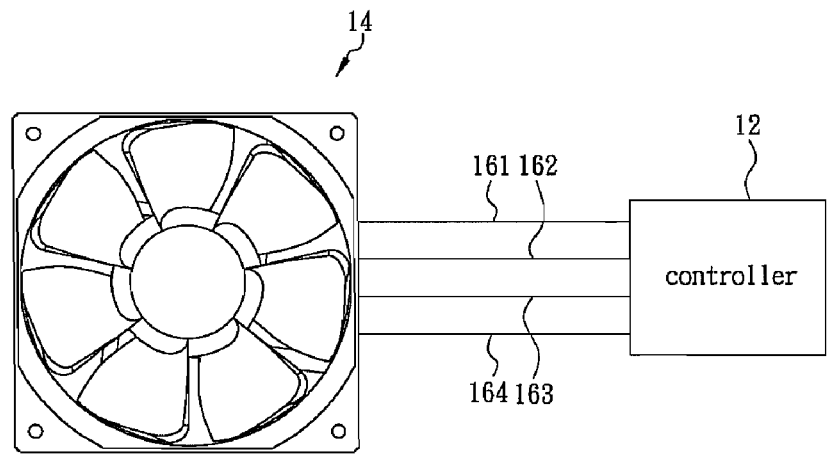
FIG. 1 is a schematic illustration showing a conventional controller coupled to a fan.
Figure 2:
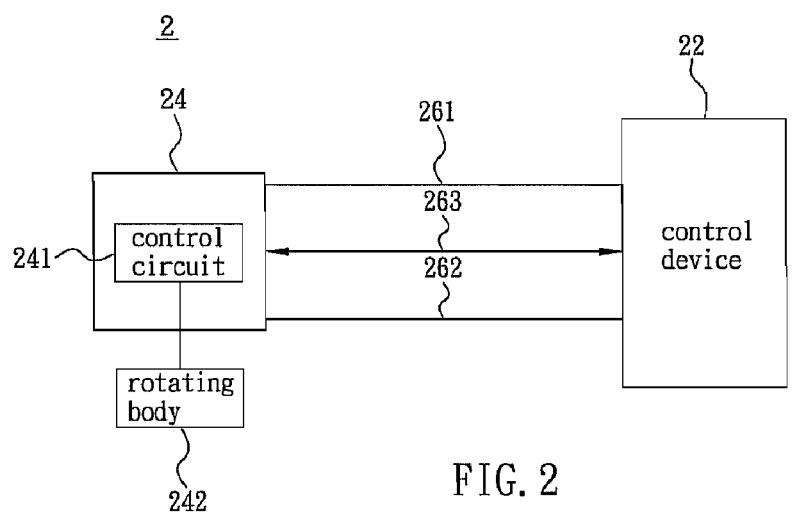
FIG. 2 is a schematic illustration showing a motor speed control system according to an embodiment of the present invention.

FIG. 2 is a schematic block diagram showing a motor speed control system 2 according to an embodiment of the present invention. Referring to FIG. 2, the motor speed control system 2 includes a control device 22, a motor 24 and a positive power signal line 261, a negative power signal line 262 and a feedback/speed-control signal line 263 coupled between the control device 22 and the motor 24. Therefore, the control device 22 controls the motor 24 and further makes the motor 24 be able to drive a rotating body 242 connected thereto. Meanwhile, the motor 24 also feeds back a rotation state signal of the rotating body 242 to the control device 22 so that the control device 22 can simultaneously monitor the operations of the motor 24 and the rotating body 242.

In order to control the rotating speed of the motor 24 precisely, the control device 22 generates a speed-control signal, and the rotating motor 24 generates a corresponding feedback signal according to the rotation state. After the control device 22 generates the speed-control signal, the speed-control signal is transmitted to a control circuit 241 in the motor 24 via the feedback/speed-control signal line 263. The control circuit 241 performs the calculation to drive the motor 24 to rotate to drive the rotating body 242 according to the corresponding rotating speed. Next, the control circuit 241 again generates the corresponding feedback signal according to the actual rotating speed of the motor 24. Alternatively, the control circuit 241 can also generate the corresponding feedback signal according to a frequency signal of switching operations of the rotating device or a rotating speed signal calculated according to the frequency signal. The feedback signal is fed back to the control device 22 via the feedback/speed-control signal line 263. Therefore, the control device 22 can judge whether the motor 24 operates at the correct rotating speed at the specific timing according to the received feedback signal.

The speed-control signal generated by the control device 22 can be a pulse signal, such as a voltage signal or a voltage controlled signal, a pulse width modulation (PWM) signal, or a hybrid signal of the pulse signal and the PWM signal generated by the control device 22. The motor 24 can be a brushless motor, and the rotating body 242 connected to the motor 24 can be a fan. The feedback signal generated by the motor 24 can be a rotating speed signal or a frequency signal of the motor 24. The control circuit 241 can calculate the signal and the data by using a control element, such as a motor driving chip, a microprocessor, or other elements. In addition, a switch element (not shown) can be provided and coupled between the control element and the feedback/speed-control signal line.

Two different embodiments corresponding to the motor and the motor speed control system of the present invention will be described with reference to FIGS. 3 and 4.

Figure 3:
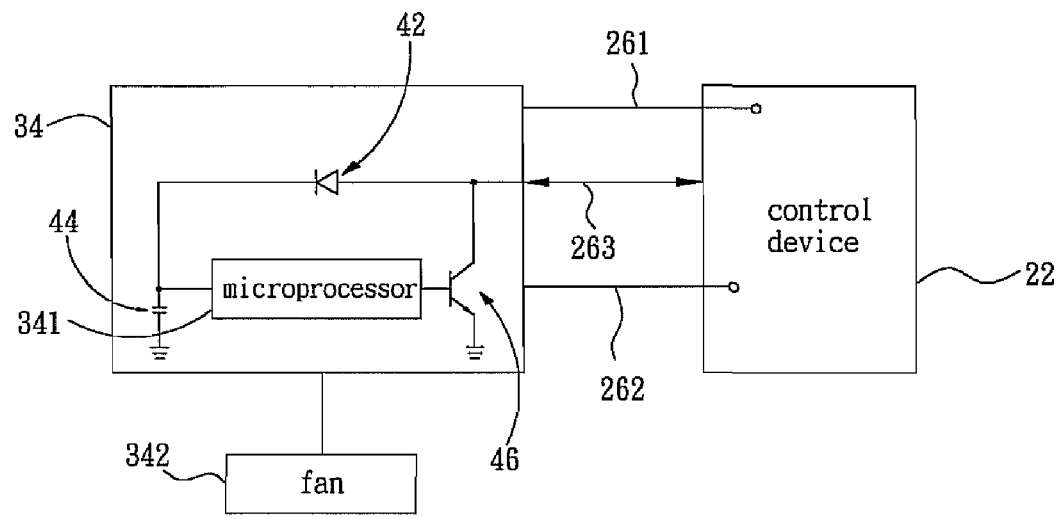
FIG. 3 is a schematic illustration showing a brushless motor applied with the motor speed control system according to the embodiment of the present invention.

First, as shown in FIG. 3, a brushless motor 34 of the present invention is connected to a fan 342 to drive the fan 342 to rotate. The brushless motor 34 is coupled to the control device 22 via the positive power signal line 261, the negative power signal line 262 and the feedback/speed-control signal line 263. The control device 22 generates the speed-control signal for controlling the brushless motor 34, and the speed-control signal is transmitted to the brushless motor 34 via the feedback/speed-control signal line 263. In this embodiment, the speed-control signal is a voltage signal. After the brushless motor 34 receives the speed-control voltage signal, its control element, such as a motor driving IC or a microprocessor 341, calculates the corresponding rotating speed according to the voltage signal and a driving voltage such as a full-potential Vcc, and drives the brushless motor 34 so as to rotate the fan 342 according to the calculated rotating speed. Meanwhile, the microprocessor 341 further detects an actual switching frequency of the brushless motor 34 (such as a signal representing an actual rotation speed of the fan 342) by using a phase detection circuit (not shown in the figures) and generate the corresponding feedback signal, such as a frequency signal, which is then transmitted to the control device 22 via the feedback/speed-control signal line 263.

Although the speed-control voltage signal and the feedback signal are transmitted via the feedback/speed-control signal line 263, they have different transmission directions, properties and frequencies. Therefore, no interference between the two signals will be raised so that the control device 22 will not influence the rotating speed of the brushless motor 34, or the correctness of the feedback of the brushless motor 34 with respect to the rotating speed.

In addition, the circuit architecture generating the feedback signal of the brushless motor 34 according to this embodiment is the open collector design and includes a diode 42 and a capacitor 44. A first end of the diode 42 is coupled to the feedback/speed-control signal line 263. A first end of the capacitor 44 is coupled to a second end of the diode 42 and coupled to the microprocessor 341 of the brushless motor 34, and a second end of the capacitor 44 is grounded. In addition, the microprocessor 341 is further coupled to a switch element 46, which can be a transistor. For example, the switch element 46 can be, without limitation to, an NPN bipolar junction transistor. However, the above-mentioned circuit architecture only corresponds to one embodiment and does not intend to limit the circuit design of the present invention in the actual application. That is, the circuit architecture equivalent or similar to the above-mentioned circuit design may be regarded as falling within the scope of the present invention.

Figure 4:
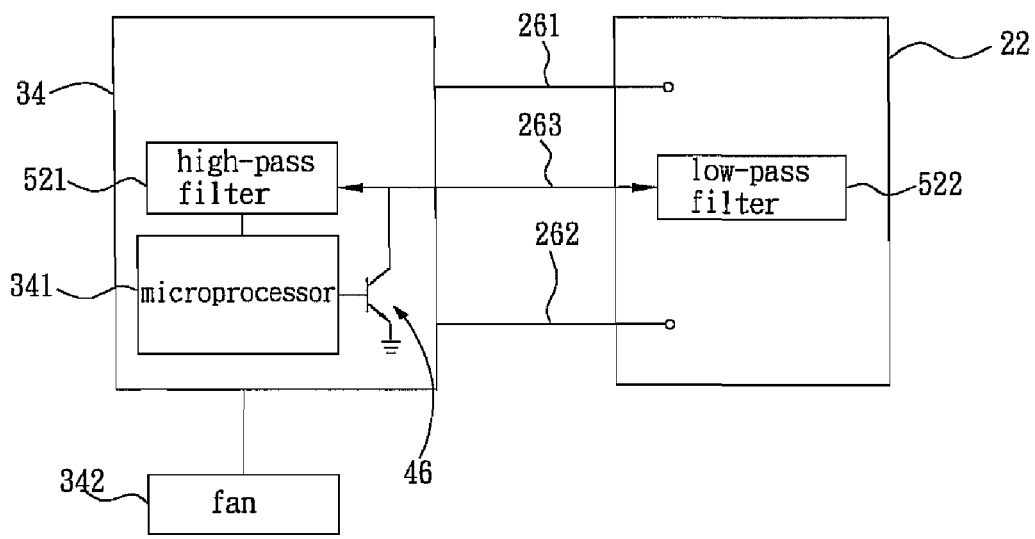
FIG. 4 is another schematic illustration showing another brushless motor applied with the motor speed control system according to the embodiment of the present invention.

Next, as shown in FIG. 4, another brushless motor of the present invention is similar to that of FIG. 3 except that the feedback/speed-control signal line 263 of FIG. 4 is further coupled to filter units in the control device 22 and in the brushless motor 34. The filter units include a high-pass filter 521 and a low-pass filter 522. Herein, the high-pass filter 521 is integrated in the brushless motor 34 and coupled to the microprocessor 341 thereof, and the low-pass filter 522 is integrated in the control device 22.

The control device 22 generates the speed-control signal for controlling the brushless motor 34 and transmits the speed-control signal to the brushless motor 34 via the feedback/speed-control signal line 263. The speed-control signal in this embodiment is the PWM signal with high frequency. Therefore, after the brushless motor 34 receives the PWM signal, the high-pass filter 521 thereof filters out the low frequency portion and the filtered signal enters the microprocessor 341. Thus, the microprocessor 341 can calculate the corresponding rotating speed according to this PWM signal and drives the brushless motor 34 to rotate and thus to drive the fan 342 to rotate according to the calculated rotating speed. Meanwhile, the microprocessor 341 further generates the corresponding feedback signal, such as the frequency signal, according to the actual switching frequency of the brushless motor 34 and transmits the feedback signal via the feedback/speed-control signal line 263. Compared with the PWM signal, the frequency of the feedback signal is lower than that of the PWM signal. Therefore, the feedback signal from the brushless motor 34 can be firstly filtered out by the low-pass filter 522 so that the filtered feedback signal without the noises of high frequency can enter the control device 22.

In addition, the above-mentioned two embodiments are the applications of the brushless motor. A phase signal sampling circuit in the brushless motor for transforming the actual rotating speed of the brushless motor into the feedback signal can be a Hall sensor. Thus, it is possible to detect the switching frequency signal of the brushless motor using the Hall sensor firstly, and then the detected switching frequency signal can be sent to the control element of the control circuit of the brushless motor. Thus, the control element can calculate and convert the switching frequency signal into the feedback signal, which can be read by the control device. Because the methods of detecting and converting this signal are well known in the art, detailed descriptions thereof will be omitted.

According to the technological features, it is obtained that the speed-control signal and the feedback signal are transmitted via the same signal line with the bi-directional transmission ability in the motor and the motor speed control system of the present invention. Thus, the overall circuit architecture can be simplified, the overall hardware cost can be reduced, and the assembling time can be shortened. In addition, the possibility that the overall architecture fails due to one single failed element can be lowered because the number of elements (such as signal lines) is decreased.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor speed control system, comprising:
   a control device for generating a speed-control signal;
   a motor for generating a feedback signal; and
   a feedback/speed-control signal line coupled between the motor and the control device, wherein the speed-control signal is transmitted to the motor via the feedback/speed-control signal line, and the feedback signal is transmitted to the control device via the feedback/speed-control signal line;
   wherein the speed-control signal is a pulse signal, a pulse width modulation (PWM) signal, or a hybrid signal by the pulse signal and the PWM signal, and the feedback signal is a rotating speed signal or a frequency signal of the motor.

2. The motor speed control system according to claim 1, wherein the speed-control signal and the feedback signal are voltage signals or voltage controlled signals.

3. The motor speed control system according to claim 1, wherein the motor comprises a phase signal sampling circuit for detecting a phase switching signal generated when the motor is operating, and getting and outputting a corresponding phase signal.

4. The motor speed control system according to claim 3, wherein the phase signal sampling circuit is a Hall element.

5. The motor speed control system according to claim 3, wherein the motor further comprises a control circuit coupled to the phase signal sampling circuit for receiving the phase signal and generating the feedback signal.

6. The motor speed control system according to claim 5, wherein the control circuit comprises:
   a control element; and
   a switch element coupled to the control element and the feedback/speed-control signal line.

7. The motor speed control system according to claim 1, wherein the motor comprises a control circuit coupled to the feedback/speed-control signal line, and the control circuit outputs the feedback signal.

8. The motor speed control system according to claim 7, wherein the control circuit comprises:
   a control element; and
   a switch element coupled to the control element and the feedback/speed-control signal line.

9. The motor speed control system according to claim 8, wherein the control element is a motor driving IC or a microprocessor.

10. The motor speed control system according to claim 8, wherein the switch element is a transistor or an NPN bipolar junction transistor.

11. The motor speed control system according to claim 8, wherein the control circuit further comprises a diode and a capacitor, a first end of the diode is coupled to the feedback/speed-control signal line, a second end of the diode is coupled to a first end of the capacitor and the control element, and a second end of the capacitor is grounded.

12. The motor speed control system according to claim 1, wherein the control device has a first filter element, the motor has a second filter element, and the first filter element and the second filter element are coupled to the feedback/speed-control signal line.

13. The motor speed control system according to claim 12, wherein the first filter element is a low-pass filter, and the second filter element is a high-pass filter.

14. The motor speed control system according to claim 1, wherein the motor is a brushless motor and applied to a fan.

15. The motor speed control system according to claim 1, wherein the feedback/speed-control signal line is a single line.

16. A motor electrically connected to a control device, the motor comprising:
   a control circuit for generating and outputting a feedback signal; and
   a feedback/speed-control signal line coupled between the control circuit and the control device, wherein the control device controls a speed-control signal to be transmitted via the feedback/speed-control signal line to the motor, and the feedback signal is transmitted to the control device via the feedback/speed-control signal line;
   wherein the speed-control signal is a pulse signal, a pulse width modulation (PWM) signal, or a hybrid signal by the pulse signal and the PWM signal, and the feedback signal is a rotating speed signal or a frequency signal of the motor.

17. The motor according to claim 16, wherein the control circuit comprises:
   a control element; and
   a switch element coupled to the control element and the feedback/speed-control signal line,
   wherein the control element is a motor driving IC or a microprocessor, the switch element is a transistor or an NPN bipolar junction transistor.

18. The motor according to claim 17, wherein the control circuit further comprises a diode and a capacitor, a first end of the diode is coupled to the feedback/speed-control signal line, a second end of the diode is coupled to a first end of the capacitor and the control element, and a second end of the capacitor is grounded.

19. The motor according to claim 16, wherein the control device has a first filter element, the motor has a second filter element, and the first filter element and the second filter element are coupled to the feedback/speed-control signal line.

20. The motor according to claim 16, wherein the feedback/speed-control signal line is a single line.

* * * * *